May 18, 1965  R. R. HAGER  3,184,269
BRAKE BALANCING DEVICE FOR HYDRAULIC BRAKE SYSTEM
Filed Oct. 19, 1961  6 Sheets-Sheet 6
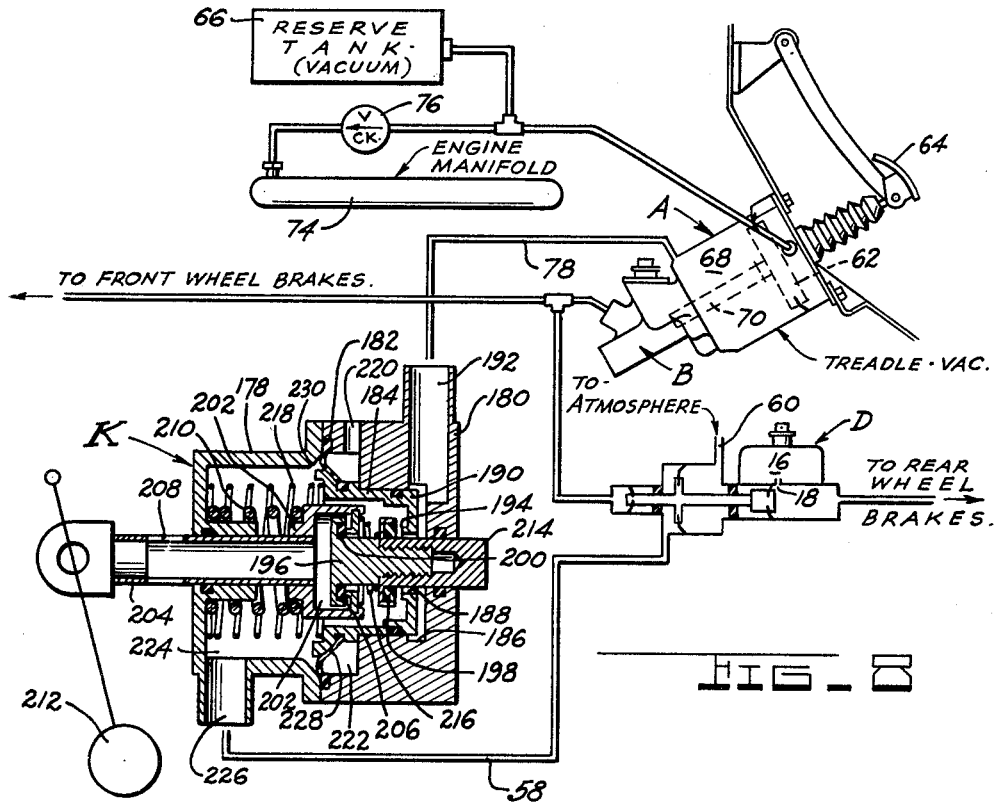
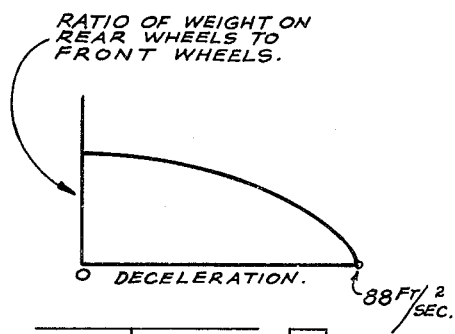
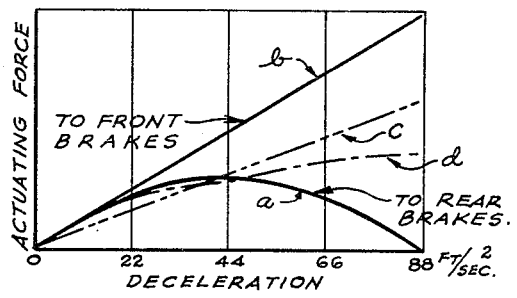
INVENTOR.
ROBERT R. HAGER.
BY
William P. Hickey
ATTORNEY.

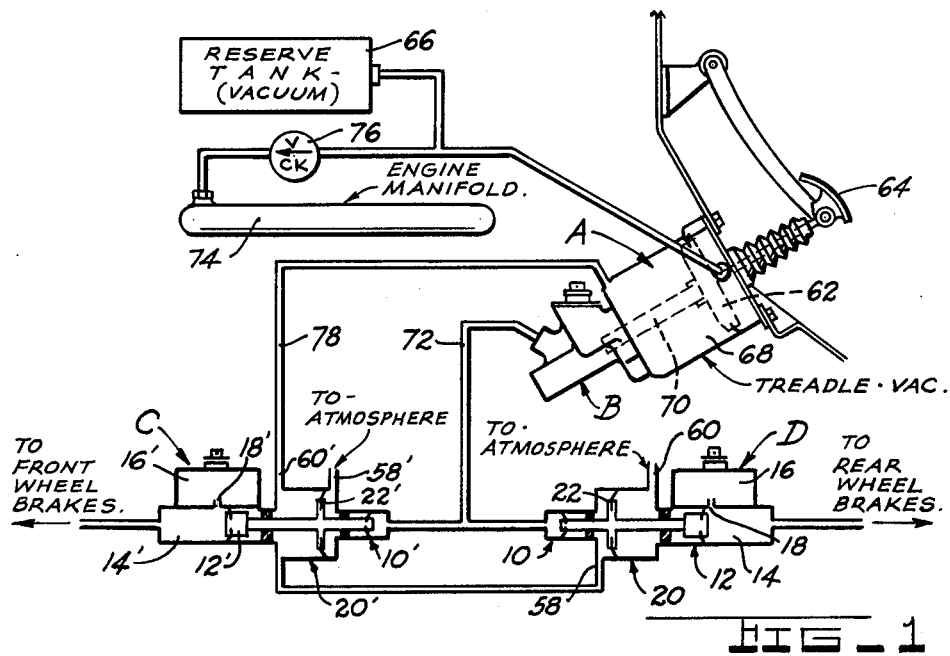
FIG_1
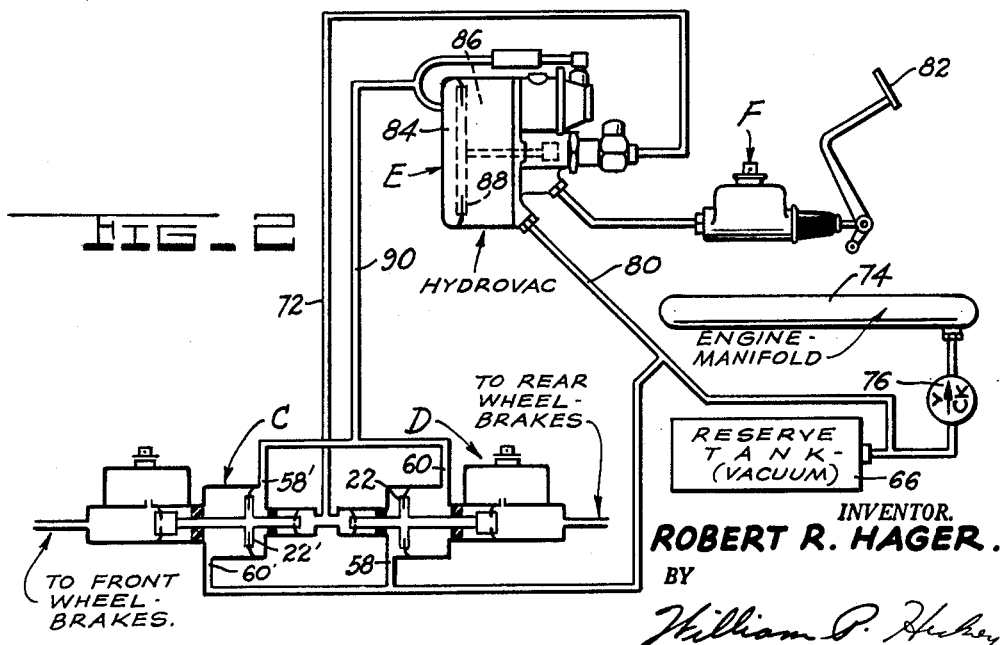
FIG_2
INVENTOR.
ROBERT R. HAGER.
BY
William P. Hickey
ATTORNEY

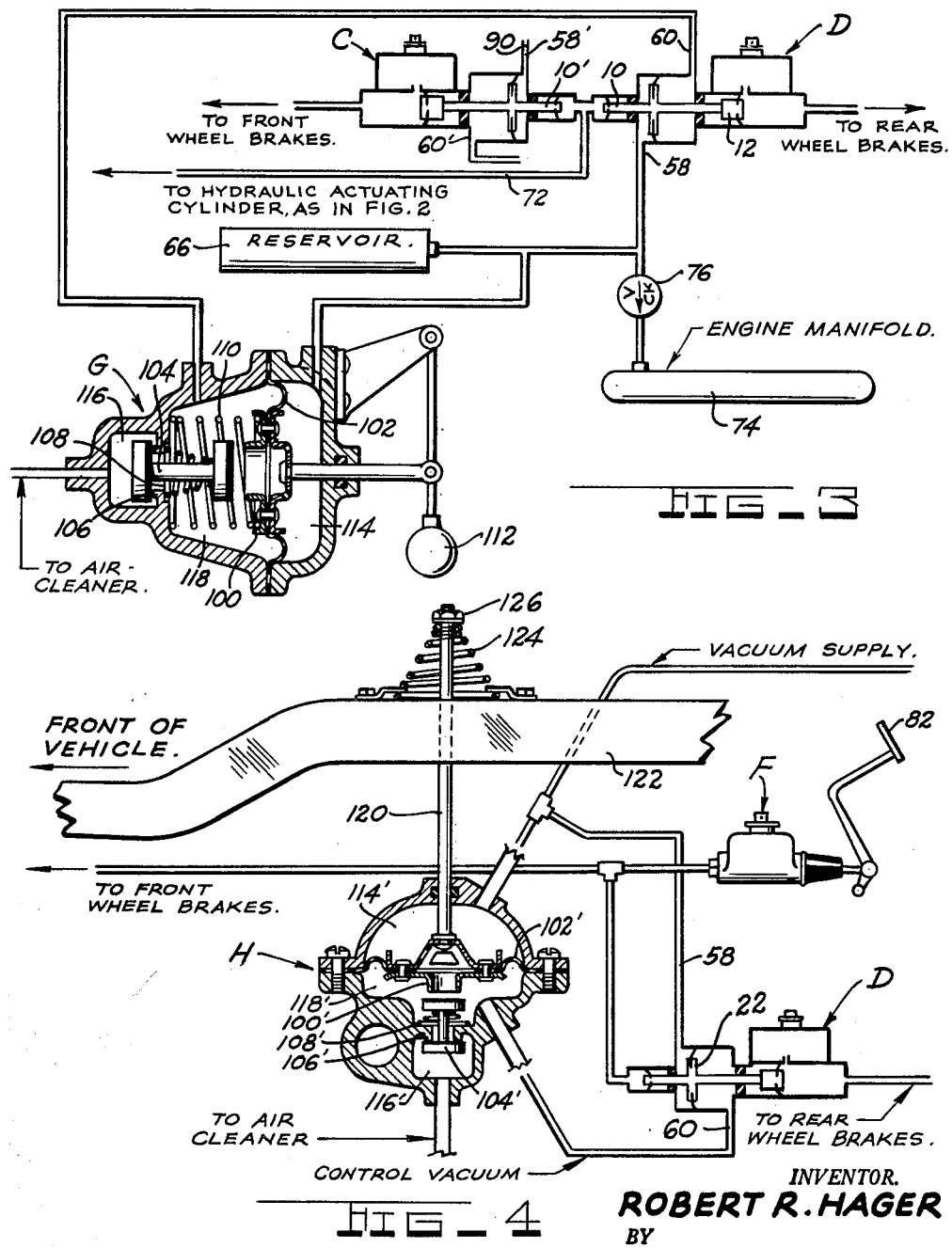

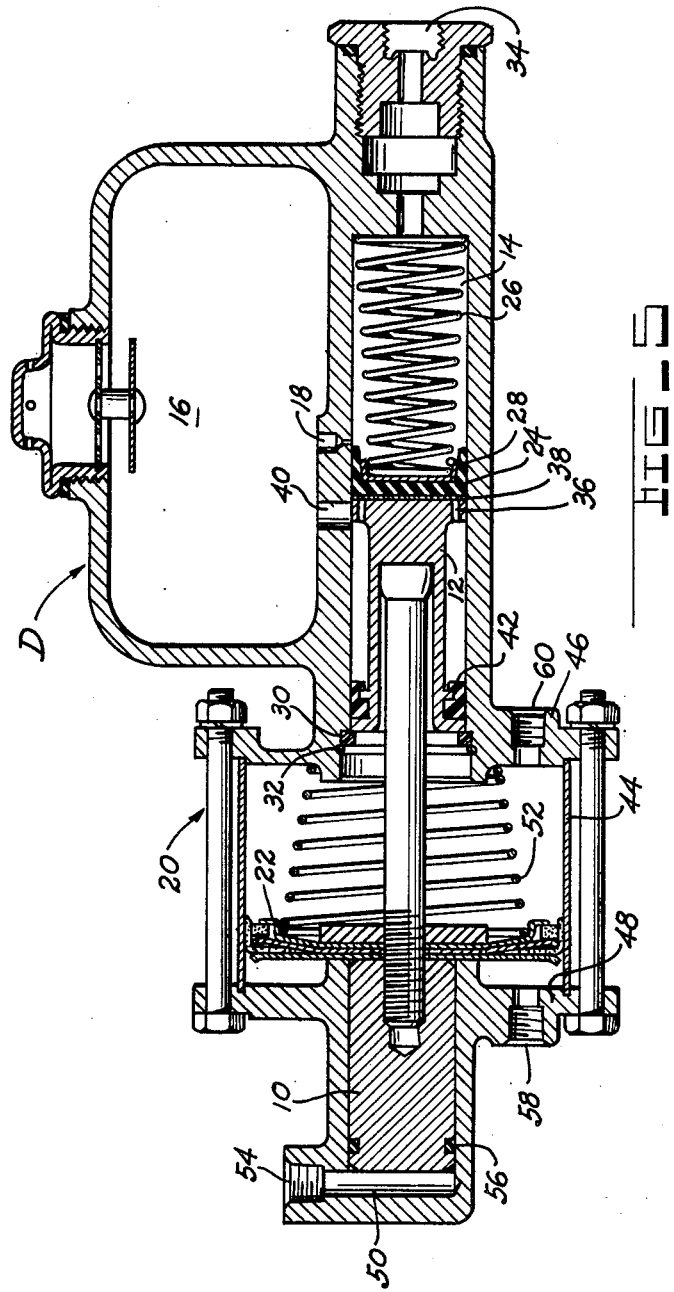

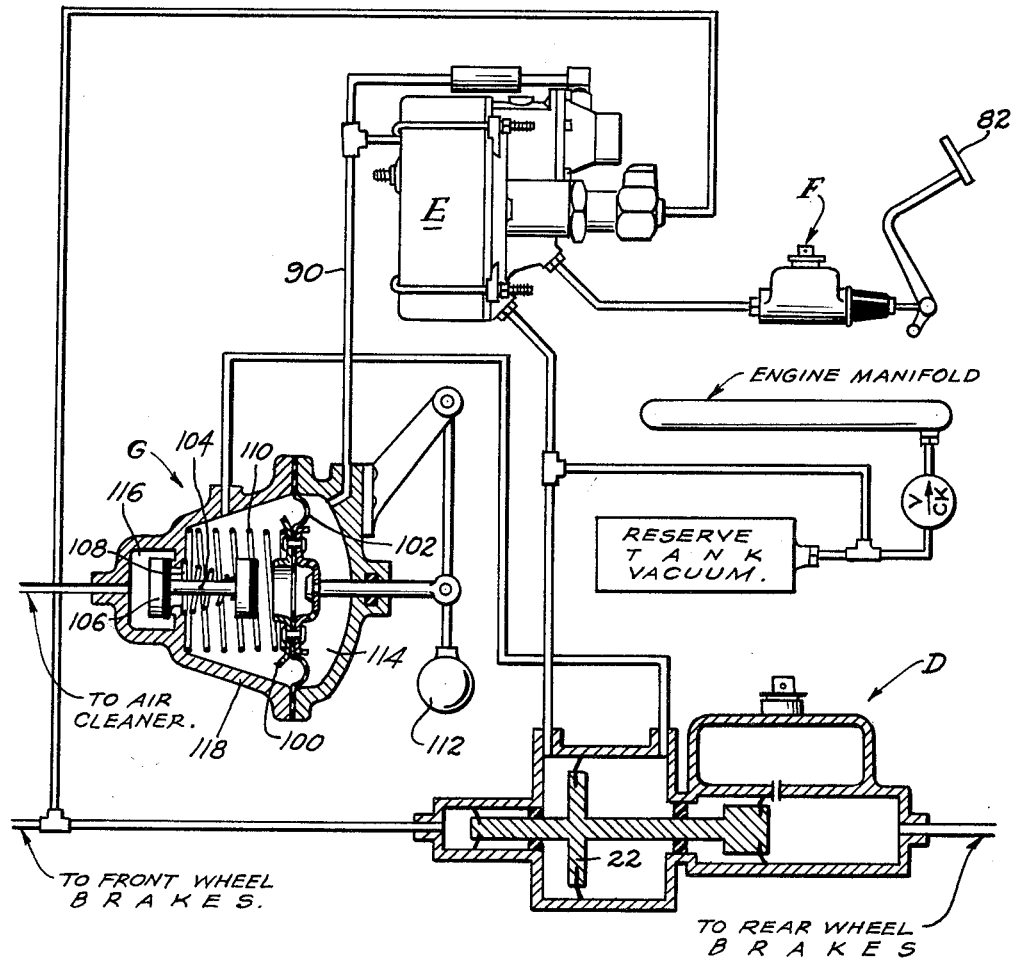

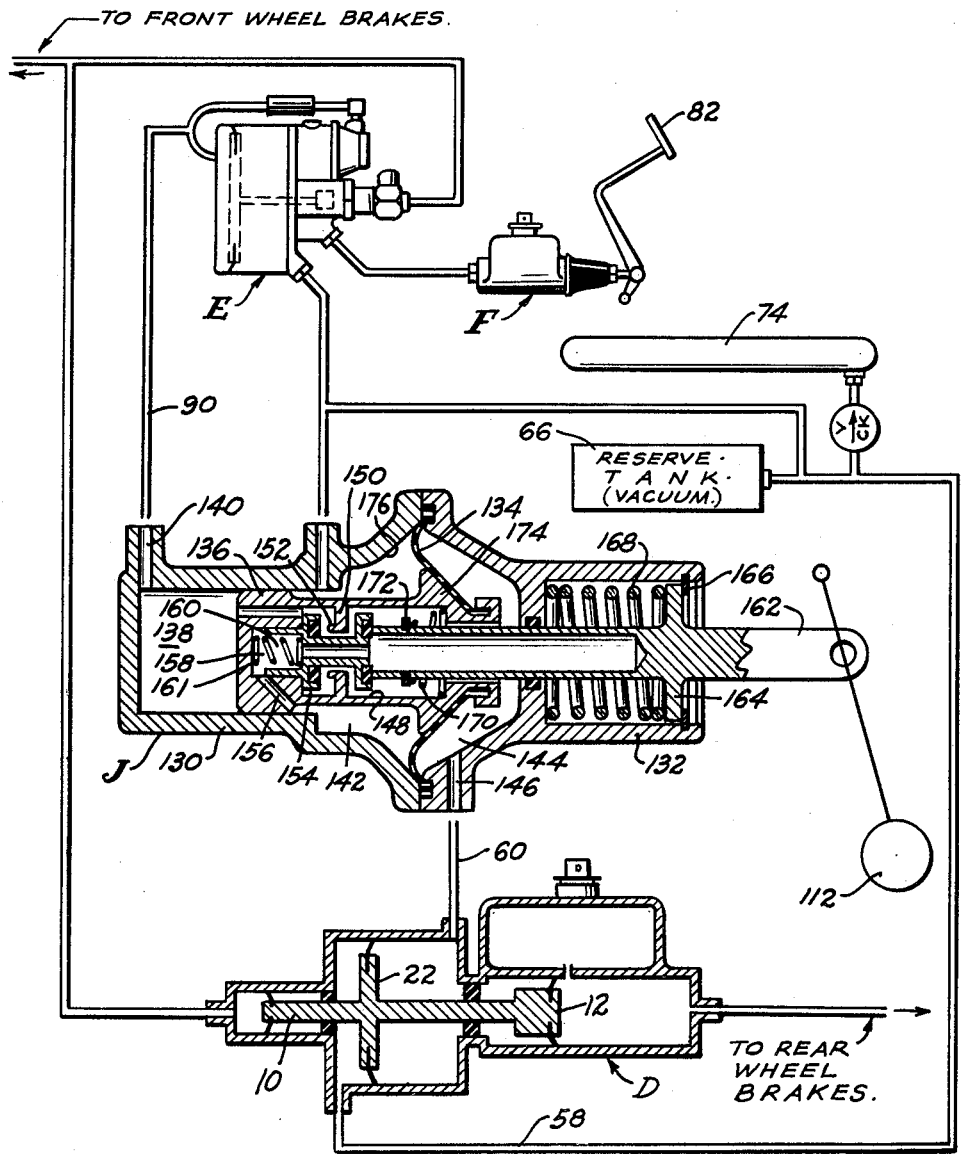
FIG_7
INVENTOR.
ROBERT R. HAGER
BY
William P. Hickey
ATTORNEY.

United States Patent Office 3,184,269
Patented May 18, 1965

3,184,269
BRAKE BALANCING DEVICE FOR HYDRAULIC BRAKE SYSTEM
Robert R. Hager, South Bend, Ind., assignor to The Bendix Corporation, South Bend, Ind., a corporation of Delaware
Filed Oct. 19, 1961, Ser. No. 146,101
6 Claims (Cl. 303—6)

The present invention relates to automotive braking systems having provisions for producing different braking efforts on its front and rear wheels; and more particularly to pneumatic fluid pressure actuated braking systems which will apply different braking efforts to the front and rear wheels of the automobile.

The art has long known that a weight shift occurs during a deceleration of an automotive vehicle which shifts additional weight of the vehicle onto its front wheels to increase the braking effort which they can produce while decreasing the weight on rear wheels of the vehicle to decrease the braking effort which they can produce. It has also been known that the amount of braking effort which can be produced by either the front or rear wheels of the vehicle changes with the type of road surface over which the vehicle is traveling, and also changes with climatic conditions.

It will be understood that the principles of the present invention are applicable to any type of vehicle braking system regardless of whether the front and rear wheel brakes are actuated pneumatically, hydraulically or mechanically. Most of the prior art braking systems which have attempted to modify the braking effort of the rear wheel brakes as a function of vehicle deceleration have used hydraulically actuated braking systems, and these systems have usually limited the amount of hydraulic actuating pressure which was supplied to the rear wheel brakes in order to prevent the rear wheels from sliding prematurely. Such systems are not satisfactory, inasmuch as the maximum braking effort which can be produced on any vehicle surface depends upon climatic conditions, etc., as previously explained so that if the hydraulic pressure to the rear wheels is limited at too low a pressure, the maximum vehicle braking effort is not obtained on dry pavement, and if the hydraulic braking pressure is cut off to the rear wheels at too high a pressure, the rear wheels will slide on wet pavement.

A further condition occurs in automotive vehicle braking structures which makes it difficult to proportion the braking effort between the front and rear wheel brakes to give the maximum braking effort at which the vehicle is capable under all conditions without sliding of any wheels. This condition arises by reason of the fact that the coefficient of friction of the brake lining varies with temperature, so that it does not remain constant from one stop to the next, or even during a single stop. This is a further reason why prior art systems which controlled the braking effort of the front and rear wheel brakes by means of pressure sensitive devices have not been successful.

The difference between the weight on the front and the rear wheels of an automotive vehicle changes in a nonlinear function with respect to vehicle deceleration; and accordingly, it is another object of the present invention to vary the difference in braking effort which is produced between the front and rear wheel brakes of the vehicle in a manner which varies as a nonlinear function of the vehicle deceleration, and which is independent of the brake actuating forces which are supplied to the brake structures of the front and rear wheel brakes.

Hydraulic valve structures which will produce a nonlinear discharge pressure are quite difficult to produce, and accordingly a still further object of the present invention is the provision of a braking system having front and rear wheel brakes wherein a pneumatic fluid pressure servomotor is used to actuate one of the brake structures, and wherein the pneumatic control signal from the first fluid pressure servomotor is relayed through a suitable control valve structure to a second pneumatic fluid pressure motor to operate the other of the brake structures.

A still further object of the present invention is the provision of a new and improved braking system of the immediately above described type wherein the first pneumatic servomotor driven structure operates the front wheel brakes, and the second pneumatic servomotor driven structure "bucks" off the force which the first servomotor applies to the rear wheel brake structure—the second control valve structure reducing the control signal which it receives from the first fluid pressure servomotor which varies as a nonlinear function of vehicle deceleration.

The invention resides in certain constructions and combinations and arrangements of parts; and further objects and advantages of the present invention will become apparent to those skilled in the art to which it relates from the following description of several preferred embodiments described with reference to the accompanying drawings forming a part of the specification, and in which:

FIGURE 1 is a schematic view of an automotive braking system embodying principles of the present invention;

FIGURE 2 is a schematic view of an automotive braking system embodying principles of the present invention, and in which its actuating servomotor is vacuum suspended;

FIGURE 3 is a schematic view of an automotive braking system embodying principles of the present invention and which shows a third embodiment of deceleration sensitive pneumatic control valve which can be incorporated into the system shown in FIGURE 2;

FIGURE 4 shows still another arrangement of automotive braking systems embodying principles of the present invention, and in which the deceleration sensitive valve is fastened between the frame and axle of the vehicle;

FIGURE 5 is an enlarged cross sectional view of one of the structures seen in FIGURES 1, 2, 3 and 4;

FIGURE 6 is a schematic view of an automotive braking system in which a deceleration sensing valve is placed in series with the output pressure from one servomotor and is used to control another so that the ratio of the output to the input of the system will always be proportional to deceleration;

FIGURE 7 is a schematic diagram of a system similar to that shown in FIGURE 6 and including a cross section of a deceleration sensing valve which will make the ratio of the output to input of the system a nonlinear function of deceleration;

FIGURE 8 is a schematic diagram of an automotive braking system actuated by atmospheric suspended power units, and in which the control pressure from the primary unit is relayed to the secondary unit by means of a deceleration sensing valve shown in section which causes the ratio of the output to input to be a nonlinear function of vehicle deceleration;

FIGURE 9 is a diagram showing qualitatively the ratio of how the weight on the rear wheels to the weight on the front wheels varies with vehicle deceleration; and FIGURE 10 is a diagram plotting actuating forces delivered to the front and rear wheel brakes versus vehicle deceleration for various embodiments of the invention described above.

In order that the various embodiments of the invention can be more fully understood, an understanding of the manner in which the weight distribution of a vehicle changes during a deceleration must first be understood. Inasmuch as the main portion of the weight of a vehicle is suspended from the road surface by means of springs etc., vehicle deceleration causes the front end of the vehicle to move downwardly and the rear end of the vehicle to move upwardly by reason of the weight shift which occurs during the deceleration period. At some upper limit of deceleration, which in some instances may be 88 ft./sec.$^2$, no weight exists on the rear wheels. If no spring action were involved, the weight change on the rear wheels of the vehicle would be a linear function; but by reason of the spring action, this weight change is caused to assume a shape which is generally parabolic and of the qualitative nature shown in FIGURE 9.

Inasmuch as the coefficient of friction between the vehicle's wheels and the road surface changes very drastically with weather conditions and road surfaces etc., from an amount less than a coefficient of .1 to instances where it can approach 1.0 the amount of braking effort used to actuate both the front and rear wheel brakes will be ideally in proportion to the weight which exists on the wheels at any and all rates of deceleration. By so doing, the front and rear wheel brakes will be caused to slide at the same time regardless of the type of road surface over which the vehicle is traveling. For this to be accomplished, the ratio of the actuating force supplied to the rear wheel brakes with respect to the actuating force applied to the front wheel brakes when plotted versus vehicle deceleration will have a shape which is qualitatively that shown by curve $a$ in FIGURE 10. In most instances it will be desirable to actuate the front brakes of the vehicle by means of a force which is substantially linear, and will correspond generally to that shown by curve $b$ in FIGURE 10. It will be seen that curve $a$ starts off tangentially with respect to curve $b$ and gradually falls off therefrom as the rate of vehicle deceleration increases. It should also be noted that with a coefficient of friction of 1.0 between the tires of the vehicle and the road surface the maximum rate of deceleration which can possibly be achieved is 32 ft./sec.$^2$. In order that the rear wheel brakes will not slide as vehicle weight is shifted therefrom, the actuating pressure which is supplied to the rear brakes must always be below curve $a$ of FIGURE 10.

Where the actuating force which is supplied to the rear wheel brakes is a linear function of deceleration as shown in curve $c$ of FIGURE 10, the vehicle braking system can only be designed for only one coefficient of friction of its brake lining and for only one road condition (both of which change drastically) so that the curve $c$ will not cross curve $a$ at too low a deceleration. Otherwise the rear wheel brakes will slide before the maximum weight of deceleration of which that vehicle is capable occurs. In such systems, therefore, the curve $c$ is made to fall considerably below the curve $a$ so that the rear wheel brakes do not do as much of the braking at low rates of deceleration as they would otherwise be capable of. A slightly better compromise occurs by supplying the pressure to the rear wheel brakes in two stages, such as shown by the curve $d$. In curve $d$, the ratio of the pressure supplied to the rear wheel brakes as opposed to that supplied to the front wheel brakes starts off initially at one rate; and after a predetermined deceleration is reached, a second stage occurs wherein a smaller proportion of actuating force is supplied to the rear wheel brakes. This allows the curve $a$ to be approached more nearly throughout the desired range of vehicle deceleration.

According to principles of the present invention the hydraulic output of one pneumatic servomotor driven fluid pressure producing device is split in two portions (one to the front brakes and one to the rear brakes) and a second pneumatic motor driven device is used to either intensify or "buck-off" the pressure in one of the portions. According to other principles of the invention the pneumatic actuating pressure which drives the first motor is also used to drive the second motor; and according to still further principles, a deceleration sensing pneumatic control valve is interpositioned between the two pneumatic motors to tailor the brake response in one portion of the system. A similar result can perhaps be produced by hydraulic valving in one portion of the system, but hydraulic valving involves difficult sealing problems, is less flexible and responsive, and is much more costly to produce.

The braking system shown in FIGURE 1 generally comprises an atmospheric suspended vacuum powered servomotor A which is used to displace hydraulic fluid from a master cylinder B to a pair of hydraulic pressure modifying units C and D respectively. In the embodiment shown in FIGURE 1, the hydraulic pressure modifying unit C is used to increase the hydraulic pressure received from the master cylinder B and transmit the same to the front wheel brakes of the vehicle; and the hydraulic pressure modifying unit D is used to receive the same fluid pressure from the master cylinder B and decrease the pressure thereof before transmitting it to the rear wheel brakes of the automotive vehicle. The use of both of the hydraulic pressure modifying units C and D will not be required in all instances; and although the units are similarly constructed, they may be proportioned somewhat differently to produce different degrees of pressure modification. Inasmuch as the units C and D are similar, only the unit D will be described in detail. Corresponding portions of the unit C will be designated by like reference numerals characterized further in that a prime mark is affixed thereto.

The unit D generally comprises a hydraulic input piston 10 that is mechanically and directly connected to an output piston 12 which displaces fluid from a cylinder bore 14 to the rear wheel brakes of the automative vehicle. The hydraulic cylinder 14 is provided with the usual low pressure reservoir 16 of compensating fluid which is communicated with the hydraulic cylinder 14 through a compensating port 18 when the piston 12 is in its normal retracted position in order that the rear wheel brakes will at all times be kept full of hydraulic fluid. The pressure modifying unit D further includes an atmospheric suspended air motor 20 positioned between the input piston 10 and the output piston 12 to act directly and mechanically upon these pistons, and change or modify the force which is delivered to the output piston 12. For a more complete understanding of the construction and operation of the pressure modifying unit D reference may now be had to FIGURE 5 of the drawings.

The output hydraulic cylinder chamber 14 shown in FIGURE 5 is formed by means of a conventional master cylinder. The output piston 12 of the master cylinder is provided with the usual cup-shaped packing 24 which is held against the inner end of the piston 12 by means of a spring 26 that is wedged between the end of the bore 14 and a seal retainer 28 positioned against the cup seal 24. The spring 26 normally holds the piston 12 in a retracted position against a return stop 30 which is held in the outer end of the bore 14 by means of a snap ring 32. A compensating port 18 is located forwardly of the retracted position of the lips of the cup packing 24. As the piston 12 is moved forwardly, therefore, the lips of the seal 24 slip over the compensating port 18 to close off communication with the low pressure reservoir 16; and thereafter fluid is forced out of the chamber 14 and through the outlet connection 34 leading to the rear wheel brakes of the automotive vehicle. In order that a vacuum can never be drawn within the output hydraulic cylinder chamber 14, small holes 36 are provided in the inner flange of the spool-shaped piston 12 to communicate fluid under atmospheric pressure to the rear side of the lips of the cup-shaped packing 24. Upon a retraction of the piston 12, fluid can be sucked through the openings 36 and around the outside of the packing 24 to the chamber 14 should a vacuum develop therein. A thin disc 38 is placed over the holes 36 to prevent pressure from extruding the rubber packing 24 through the openings 36. Fluid under atmospheric pressure is communicated to the rear side of the seal 24 at all times by means of a port 40; and leakage out of the bore 14 is prevented by means of a seal 42 that is positioned on the outer end of the piston 12 so as to never move past the port 40.

The air motor 20 of the hydraulic pressure modifying unit D is formed by means of an annular steel shell 44 which is sealingly clamped between the cast housing 46 of the hydraulic cylinder 14 and the cast housing 48 of the input hydraulic chamber 50 in which the input piston 10 is located. The piston 22 of the air motor is of conventional construction and is threadedly attached to an extension of the piston 10 which passes through the air motor 20 and bears against the output piston 12. The inner connecting piston structure shown is biased into its retracted position shown in the drawing, by means of a coil spring 52. Fluid pressure from the master cylinder B is communicated to the input hydraulic chamber 50 through the inlet connection 54, and a suitable seal 56 is provided on the piston 10 to prevent leakage into the air motor 20. Inlet connections 58 and 60 are provided for the power chambers on opposite sides of the power piston 22. When the unit D is connected as shown in FIGURE 1 of the drawings, inlet connection 58 is connected to receive the control pressure from the servomotor A and the opposite inlet connection 60 is communicated to the atmosphere.

The fluid pressure servomotor A and master cylinder B shown in FIGURE 1 are generally of the type shown and described in the Earl R. Price Patent No. 2,818,710 and for a complete understanding of its construction and operation, reference may be had to that patent. In general, atmospheric pressure is communicated to opposite sides of its power piston 62 in the normal retracted position shown in the drawing; and when the foot pedal lever 64 is depressed to actuate the unit, vacuum from a reservoir 66 is communicated to the chamber 68 in the inner side of the power piston 62 to force the displacement piston 70 into the master cylinder B and thereby force fluid out of its outlet connection 72 to the pistons 10 and 10' respectively. Reservoir 66 is normally supplied with vacuum from the manifold 74 of the vehicle's propelling engine through a check valve 76 which maintains the reservoir 66 at a high vacuum level.

The power piston 62 contains suitable control valve structure actuated by the pedal lever 64 for causing a decreasing pressure within the chamber 68 as increasing force is applied to the pedal 64. This decreasing pressure is communicated through conduit 78 to the connection 60' of the modifying unit C, while atmospheric pressure is communicated to the inlet connection 58' of the unit C. Control vacuum from the conduit 78 is at the same time communicated to the inlet 58 of the pressure modifying unit D, while atmospheric pressure is communicated to its inlet connection 60. In the operation of the unit shown in FIGURE 1 therefore, the decreasing control pressure within the chamber 68 causes a proportionally increasing force to be applied to the output piston 12' of the unit C to increase the hydraulic pressure on the front wheel brakes, while a proportionately increasing force is applied to the piston 10 of the pressure modifying unit D to decrease the hydraulic pressure which it delivers to the rear wheel brakes. Upon a reduction in force applied upon the foot pedal lever 64, the control valve structure within the power piston 62 of the servomotor A bleeds air pressure to its inner power chamber 68 and hence through the conduit 78 to the connection 60' of the unit C and the connection 58 of the unit D. Hydraulic output pressure from the master cylinder D is therefore reduced. Simultaneously therewith, the increasing control pressure from the chamber 68 decreases the differential pressure across the air piston 22' to further reduce the pressure delivered to the front wheel brakes while, the decreasing differential pressure across the air piston 22 reduces the "bucking off" force that is applied to the rear brakes of the vehicle. While the system shown in FIGURE 1 is capable of various modifications, both as to proportions and as to the addition of valving structures in the air lines, the system as shown will produce pressures to the front and rear wheel brakes which will vary in accordance with vehicle deceleration as shown by the curves C and D in FIGURE 10.

The braking system shown in FIGURE 2 is generally similar to that shown in FIGURE 1 in that it employs similar pressure modifying units C and D; but differs principally therefrom in that the servomotor unit E used to supply hydraulic pressure to the units C and D is of the vacuum suspended type. The servomotor unit E shown in FIGURE 2 of the drawings is of the type shown and described in the Gunther Pfeifer Patent No. 2,867,090 and is basically a pressure intensifying unit which proportionately increases a hydraulic input pressure which is received from a conventional master cylinder F. Basically the units C and F develop a hydraulic pressure in the conduit 90 which is proportional to the force applied to its foot pedal lever 82 to produce a result comparable to the units A and B shown in FIGURE 1. Those portions of FIGURE 2 which are identical to portions shown in FIGURE 1 will be designated by a like reference numeral.

The system shown in FIGURE 2 differs from that shown in FIGURE 1 principally in that the power chambers 84 and 86 on opposite sides of the power piston 88 of the servomotor unit E are normally supplied with vacuum of equal intensity during the unactuated condition of the system, and a gradually increasing pressure is supplied to the power chamber 84 as the foot pedal lever 82 is actuated. Manifold vacuum is supplied to the inlet 60' and 58 of the units C and D respectively, while control vacuum from the unit E is supplied to the inlets 58' and 60 of the units C and D respectively so that vacuum of the same intensity normally exists across the air pistons 22' and 22 of the units C and D. During actuation of the system, therefore, a build-up in differential pressure is developed across the power piston 22 which increases the hydraulic pressure to the front wheel brakes and which decreases the hydraulic pressure which is delivered to its rear wheel brakes. The system shown in FIGURE 2 will produce pressure curves similar to those of curves b and c shown in FIGURE 10 of the drawings.

The automotive hydraulic braking system shown in FIGURE 3 is a modification of that shown in FIGURE 2, and is modified in such a way as to incorporate other features of the present invention. Basically the system shown in FIGURE 3 includes a pressure modifying unit D which is supplied with hydraulic pressure through the line 72 either from a fluid pressure intensifying unit E of the type shown in FIGURE 2 or from a master cylinder F as shown in FIGURE 2. The system may also include a pressure modifying unit C in those instances where a fluid pressure intensifying unit E is also used, in which case, its inlet connection 58' will be communicated to the conduit 90 of the intensifying unit E, while its inlet connection 60' is communicated to the vacuum reservoir 74. The basic system shown in FIGURE 3 will also include the deceleration sensing valve b which bleeds a control pressure to the inlet port connection 60 of the pressure modifying unit D—which control pressure decreases proportionally with the rate of deceleration of the vehicle. With the system shown in FIGURE 3, the outlet pressure to the rear wheel brakes does not remain a predetermined proportion of the pressure which is supplied to the front wheel brakes; inasmuch as the coefficient of the front and rear brakes can change drastically while the amount of "bucking off" force on the pressure to the rear wheel brakes remains a fixed function of vehicle deceleration. The system shown in FIGURE 3 however can be made to provide a desirable compromise of rear wheel brake actuating pressure to front wheel brake actuating pressure for high rates of deceleration. By suitably sizing the input and output pistons 10 and 12, the pressures to the rear wheel brakes can always be kept below the desired curve $a$ during a first stage of brake actuation, following which the control valve G can take over to provide a second stage of brake actuation.

The deceleration sensing valve G may be of any suitable construction, and as shown in the drawing comprises a movable tubular vacuum valve seat member 100 that is suitably fastened to a diaphragm 102 and is adapted for engagement with one flange of a spool shaped poppet member 104. The other flange of the poppet member 104 is biased against an atmospheric valve seat 106 by a coil spring 108 so that upon engagement of the poppet member 104 by the vacuum valve seat 100, the poppet member 104 is lifted out of engagement with the atmospheric valve seat 106. Vacuum valve seat 100 is biased out of engagement with the poppet member 104 by means of a coil spring 110, and the vacuum valve seat 100 is caused to move towards the poppet member 104 by means of a ball weight 112 arranged to move the vacuum valve seat 100 against the poppet 104 during deceleration of the vehicle. Vacuum from the reservoir 66 is communicated to the vacuum chamber 114 on the right hand side of the diaphragm 102, and atmospheric pressure is communicated to the atmospheric chamber 116 on the left side of the atmospheric valve seat 106. Vacuum chamber 114 is normally communicated to the control chamber 118; and upon actuation of the system to produce a deceleration of the vehicle, the ball 112 forces the vacuum valve seat 100 against the poppet 104 to close off the communication between the vacuum valve chamber 114 and the control chamber 118, and thereafter moves the poppet 104 out of engagement with the atmospheric valve seat 106 to bleed air pressure into the control chamber 118. The control chamber 118 is of course communicated to the inlet connection 60 of the pressure modifying unit D, so that there is produced a "bucking off" force by the unit D which is directly proportional to the rate of vehicle deceleration. The hydraulic input pressure which is supplied to the hydraulic input line 72 may vary greatly however to produce a given rate of vehicle deceleration, depending upon the coefficient of friction of the brake linings so that the hydraulic pressure which is supplied to the rear wheel brakes will vary for any given vehicle deceleration depending upon the coefficient of friction which the brake linings have at that time. The system shown in FIGURE 3 is inexpensive to produce, and will provide a desirable compromise in most instances.

The automotive braking system shown in FIGURE 4 of the drawings is somewhat similar to that shown in FIGURE 3 in that it uses the master cylinder F shown in FIGURE 2 to supply hydraulic pressure directly to the front braking structures of the vehicle while also conducting its discharge pressure to a hydraulic pressure modifying unit D which in turn actuates the rear braking structures of the vehicle. Unit D, however, is controlled by means of a deceleration sensing valve H which is generally the same as the deceleration sensing valve G shown in FIGURE 3 but differs principally therefrom in that it senses deceleration by means of the downward movement of the front portion of the frame relative to the front axle of the vehicle. The internal working parts of the deceleration sensing valve H are generally the same as those shown for the deceleration valve G and are indicated by like reference numerals characterized further in that the prime mark is affixed thereto. The body of the deceleration sensing valve H is fixed to the front axle of the vehicle, and the vacuum valve seat member 100' is actuated by means of a push rod 120 actuated by the frame 122. The upper end of the push rod 120 projects above the vehicle's frame 122 and is biased upwardly therefrom by means of a coil spring 124 suitably interpositioned between the top of the frame 122 and the upper portion of the push rod 120.

Actuation of this system's brake pedal 82 causes hydraulic pressure to flow both to the front wheel brakes and to the rear wheel brakes through the modifying unit D to cause a deceleration of the vehicle which in turn causes the frame 122 to move downwardly toward the deceleration sensing valve H. This causes the spring 124 to pull downwardly upon the threaded nut 126 on the push rod 120, which in turn moves the vacuum valve seat member 100' into sealing engagement with the poppet 104' to close off vacuum communication with the inlet 60 of the pressure modifying unit D, and thereafter lifts the poppet 104' out of engagement with the atmospheric valve seat 106' to communicate atmospheric pressure to the inlet 60 of the pressure modifying unit D. Inasmuch as vacuum is always communicated with the opposing inlet 58 of the pressure modifying unit D, a pressure differential is built up across power piston 22 of the pressure modifying unit which in turn opposes and decreases the amount of pressure which is delivered to the rear brakes of the vehicle. As air pressure builds up in the control chamber 118', it produces a pressure differential across the diaphragm 102', as in the embodiment shown in FIGURE 3, which opposes the force applied to the push rod 120 by the spring 124. This force gradually increases until the poppet member 104' again abuts the atmospheric valve seat 106'. When this occurs, both the atmospheric valve seat 106' and vacuum valve seat 100' are closed off so that no further "bucking off" of the force applied to the rear wheel brakes occurs, unless further increase in deceleration of the vehicle is produced by a further additional force applied to the brake pedal lever 82. Whenever the foot pedal lever 82 is allowed to retract to decrease the hydraulic pressure which is delivered to the vehicle's brakes, the spring suspension of the vehicle causes the front portion of the frame 122 to move upwardly. This allows the poppet member 104' to close off the atmospheric valve seat 106; and thereafter lift the vacuum valve seat 100' out of engagement with the poppet member 104' to again vacuum suspend the power piston 22 of the pressure modifying unit D.

The embodiment shown in FIGURE 6 of the drawings is generally similar to that shown in FIGURE 3, and differs principally therefrom in that its deceleration sensing valve G is positioned in the control line 90 between the servomotor E and the pressure modifying unit D. By so doing, the action of the pressure modifying unit D is made a direct function of the braking effort applied to the front brake wheel structures of the vehicle, and the control of the rear wheel brakes can be caused to conform more closely to the characteristics of line $d$ of FIGURE 10 than does the embodiment shown in FIGURE 3.

The automotive braking system shown in FIGURE 7 corresponds generally to the types shown in FIGURES 2 and 3, and differs principally therefrom in that its deceleration sensing valve J is positioned in the control line 90 between the servomotor driven fluid pressure intensifying unit E and the pressure modifying unit D. The system differs also in that the deceleration sensing valve J is a variable ratio valve so that the pressure which this system delivers to the rear wheel brakes of the automotive vehicle will correspond generally to the curve $a$ of FIGURE 10.

The deceleration sensing valve J is formed by front and rear body sections 130 and 132 which have the outer periphery of an annular diaphragm 134 sealingly clamped therebetween. The center portion of the annular diaphragm 134 is sealingly affixed to the forwardly extending piston member 136—the forward end of which sealingly engages the sidewalls of the pneumatic inlet pressure chamber 138 having an inlet connection 140 to which the control line 90 (seen in FIGURES 2 and 3) is connected. The chamber 142 formed between the diaphragm 134, piston 136 and the rear end of the front housing section 130 forms the vacuum chamber of the valve to which vacuum from the vacuum reservoir 66 is continually communicated. The portion between the diaphragm 134 and the rear housing section 132 forms the control chamber 144 of the valve—which in turn is communicated to the inlet 60 of the brake modifying unit D through a control connection 146. The opposing connection 58 of the pressure modifying unit D is continually connected to the reservoir 66 as in the previously described embodiment shown in FIGURES 2 and 3.

The control valve structure of the deceleration sensing valve J is housed within the piston 136, and is formed generally by a chamber 148 extending longitudinally through the piston 136, and a partition member 150 extending thereacross to form the high pressure valve seat 152 of the unit. A spool shaped poppet member 154 has its center section passing through the valve seat 152 with the opposite flanges of the poppet member straddling the partition member 150. The left hand flange of the poppet member 154 acts as the valve closure member for the valve seat 152.

Vacuum from the vacuum valve chamber 142 passes through an angular passage 156 to the forward end of the internal chamber 148 to a valve balancing chamber 158 into which the forward end of the poppet member 154 sealingly projects. The poppet member 154 is biased rearwardly towards the valve seat 152 by means of a coil spring 160, and vacuum from the balancing spring 158 is communicated to the rear side of poppet member 154 through the central opening 160 of the spool shaped poppet member. Passage 160 therefore communicates vacuum to the rear face of the poppet member 154. Control of vacuum to the rear portion of the internal chamber 148, and hence to the control chamber 144, is controlled by means of a rod shaped control member 162 which slidingly projects into the rear housing section 132 for engagement with the rear flange of the poppet member 154. When the front face of the control member 162 abuts the poppet member 154, vacuum communication to the valve's control chamber 144 is closed off. The control rod 162 is normally actuated forwardly by means of a ball weight 112, as was done in the embodiment shown in FIGURE 3; and the control rod 162 is normally held in the retracted position shown in the drawings, wherein its flange 164 abuts a snap ring 166 by means of a coil spring 168 which is strong enough to overcome the atmospheric to vacuum differential produced upon the diameter of the rod 162. The piston 136 is caused to assume the normal retracted position shown in the drawing by means of a coil spring 170 interpositioned between the piston 136 and a snap ring 172 seated on the inner end of the control rod 162.

In the normal brake released condition of the system shown in FIGURE 7, vacuum from the reservoir 66 is communicated to the vacuum chamber 142 on the left side of the diaphragm 134. Vacuum of the same intensity is delivered from the control valve of the servomotor E through line 90 to the inlet chamber 138, past the open valve seat 152 to the control chamber 144 and hence to the right side of the air piston 22 in the pressure modifying unit D. Vacuum from the reservoir 66 is also communicated to the left side of the air piston 22 of the pressure modifying unit D.

The brake system is actuated by depressing the foot pedal lever 82, whereupon pressure from the master cylinder F actuates the fluid pressure servomotor driven fluid pressure intensifying unit E to force hydraulic fluid to the front wheel brakes of the vehicle. Hydraulic pressure from the unit E is also communicated to the piston 10 of the pressure modifying unit D—which in turn actuates the output piston 12 to produce hydraulic pressure in and thereby actuate the rear wheel brakes of the vehicle. Upon actuation of the servomotor E, which of course is vacuum suspended, an increasing control pressure is communicated to the inlet chamber 138 of the deceleration valve J which passes through the open valve seat 152 to the control chamber 144 of the valve J, and thence to the rear side of the air piston 22 of the pressure modifying unit D. An increase in pressure in the right hand side of the diaphragm 134 moves the partition 150 forwardly to abut the poppet 154, and thereby close off the valve seat 152 to prevent further blild-up in pressure in the control chamber 144.

According to principles of the present invention, the rear face 174 of the piston 136 is inclined forwardly and outwardly so that the diaphragm 134 will normally be abutted by the tapered surface. According to further principles of the present invention, the rear face 176 of the front housing section 130 is inclined forwardly and inwardly so that the diaphragm 134 will roll into engagement with the outer inclined surface 176 as the piston 136 moves forwardly. Upon forward movement of the piston 136 therefore, the diaphragm rolls out of engagement with the inclined surface 174 and into engagement with the inclined surface 176 to reduce the effective area of the diaphragm 134. The surfaces 174 and 176 may be shaped in any suitable manner to change the effective area of the diaphragm 134 with respect to the position of the piston 136. In the embodiment shown in the drawing, these surfaces are tapered so that the valve will provide a rear braking effort generally corresponding to the curve $a$ of FIGURE 10 of the drawings.

After the brakes of the vehicle have been applied and a deceleration of the vehicle occurs, the weight 112 overcomes the effect of the spring 168 to move forwardly and thereby bias the poppet member 154 out of engagement with the valve seat 152. This permits a further flow in pressure from the control valve of the servomotor E to the air motor portion of the pressure modifying unit D, and thereby further "bucks off" some of the pressure being delivered to the rear wheel brakes. While the poppet member 154 is out of engagement with the valve seat 152, pressure builds up on the rear side of the diaphragm 134 to roll it forwardly against the surface 176 and out of engagement with a portion of the surface 174 until the valve seat 152 again abuts the poppet member 154. After this occurs, the valve becomes stabilized, and no further air pressure is delivered to the pressure modifying unit D. It should be pointed out that the position which the control rod 162 takes with respect to the housing 132 is controlled by reason of the spring rate of the spring 168, and the weight of the ball 112; and these will be adjusted so that the inner end of the rod 162 will move from the retracted position shown in the drawing at no deceleration to the maximum movement permitted by the diaphragm structure 134 at the maximum rate of deceleration of which the vehicle is capable.

When it is desired to release the braking system shown in FIGURE 7, removal of force on the pedal lever 82 reduces the hydraulic actuating pressure in the servomotor E, and hence the front and rear wheel brakes. At the same time, the control valve structure of the servomotor E is caused to decrease the pressure in the front control chamber 138. By this time the release in hydraulic pressure to the front and rear wheel brakes will have caused a decrease in deceleration permitting the spring 168 to move the control rod 162 toward the right, and thereby permit vacuum to flow around the right hand side of the poppet member 154 to the control chamber 144. This causes the piston structure 136 to move toward the right until the poppet member 154 again engages the control rod 162. Complete release of force on the foot pedal lever 82 causes it to assume the fully released position shown in the drawings.

The automotive braking system shown in FIGURE 8 of the drawings correspond generally with that shown in FIGURE 1 and differs principally therefrom in that an atmospheric deceleration sensing valve K is positioned in the control lines 78 between the servomotor A and the pressure modifying unit D. The deceleration valve K functions in a similar manner in which the deceleration valve J operates to produce the same type of curve *a* seen in FIGURE 10; but differs from deceleration valve J in that deceleration valve K is atmospheric suspended whereas deceleration valve J is vacuum suspended.

Deceleration valve K is formed by means of front and rear housing sections 178 and 180 respectively between which is sealingly clamped the outer periphery of an annular diaphragm 182. The center portion of the diaphragm 182 is sealingly affixed to piston member 184—the rear portion of which sealingly engages the sidewalls of an internal chamber 186 in the rear housing section 180. Piston member 184 is a generally cup-shaped structure having an opening or low pressure valve port 188 in its bottom 190, and control pressure from the control valve of the servomotor A is communicated thereto through line 78 and inlet connection 192. The valve port 188 is provided with a low pressure valve seat 194 at its forward end on the inside of the cup-shaped piston member 184, and a generally spool shaped poppet member 196 is provided with a rear flange 198 for abutment with the valve seat 194. The opposite flange 200 of the spool shaped poppet member 196 is positioned within an enlarged cup 202 carried on the rear end of a tubular control member 204 which projects axially forwardly out of the front housing section 178. The rear end of the enlarged cup 202 is provided with a radially inwardly extending lip 206 which forms a high pressure valve seat against which the rear face of the flange 200 abuts. The suitable opening 208 in a tubular control member 204 communicates air pressure to the tubular member and thus to the valve seat 206 so that it can be controlled by the flange 200 of the poppet member. Enlarged cup 202 is biased rearwardly by means of a coil spring 210 and a suitable weight 212 is provided for overcoming the spring 210 during deceleration of the vehicle. This arrangement causes the high pressure valve seat 206 to take a position forwardly of the retracted position, shown in the drawing, which is a function of the rate of vehicle deceleration in much the same manner as described in the previous embodiment. The tubular poppet member 196 has a balancing projection 214 which projects rearwardly out of the housing section 180 so that it will be biased inwardly by atmospheric pressure. The projection 214 is slidingly sealed with respect to the housing section 180 on an area approaching that of the valve seats 194 and 206. The valve seat 206 is biased into engagement with the flange 200 by means of a coil spring 216, and the piston member 190 is biased rearwardly into its stop position shown in the drawing by means of another coil spring 218.

Atmospheric pressure is continually communicated through opening 220 to the area between the piston 184, rear housing section 180 and diaphragm 182. Pressure from the valve seat 194 is normally communicated to the control chamber 224 within the cup-shaped piston 184, to the front face of the diaphragm 182, from whence it is communicated to the inlet connection 58 of the pressure modifying unit D through the control connection 226. The surface 228 of the cup piston 184 which abuts the diaphragm 182 is tapered outwardly and forwardly, while the surface 230 on the front housing section 182 just forwardly of the outer portion of the diaphragm 182 is tapered radially inwardly and forwardly so that the diaphragm 182 rolls out of engagement with the inner tapered surface 228 into abutment with the outer tapered surface 230 as the piston 184 moves forwardly. The diaphragm and tapered surfaces 228 and 230 produce generally the same type of changing pressure ratios between the valve's inlet 192 and outlet 226 as that of the previous embodiment to produce an actuation of the rear wheel brakes as indicated by curve *a* of FIGURE 10.

The operation of the system shown in FIGURE 8 functions in generally the same manner to produce the same result as does the embodiment shown in FIGURE 7, excepting that the pressure in the outlet connection 226 decreases with increasing vehicle deceleration whereas the pressure in the outlet connection 146 of the valve J was caused to increase with increasing vehicle deceleration. Inasmuch as the operation is quite similar to that discussed for FIGURE 7, it will not be now described in as complete a detail.

Generally speaking, the system is in the deactuated or released condition shown in FIGURE 8. In the condition shown in the drawing, atmospheric pressure exists in the inlet port 192 and in the outlet port 226. Depressing of the foot pedal lever 64 causes vacuum to be communicated to the inlet connection 192 by the control valve mechanism of the servomotor A, which passes through the port 188 to the front side of the diaphragm 182, to move the piston 124 forwardly into engagement with the poppet member 196 and thereby close off the low pressure valve port 194. At the same time front and rear wheel brakes will be actuated by the servomotor A to produce a deceleration which causes the tubular member 204 to move forwardly—pulling the poppet member 196 out of engagement with the valve seat 194 to further decrease the pressure in the outlet connection 226 which leads to the inlet connection 58 of the pressure modifying unit D. This causes a "bucking off" of part of the actuating force to the rear wheel brakes, as was previously described for the system shown in FIGURE 1. In the present instance, however, the amount of "bucking off" force changes with the rate of deceleration of the vehicle. As previously explained, the spring 210 has an appreciable spring rate which causes the high pressure valve seat 206 to take a position forwardly from the position shown in FIGURE 8 depending upon the rate of vehicle deceleration. As the piston 184 moves forwardly to follow the valve seat 206, the diaphragm 182 rolls into engagement with the surface 230 and out of engagement with the surface 228 to cause a gradually decreasing force to be applied to the piston 184—and hence requiring a greater amount of vacuum to be communicated to the outlet connection 226 as the piston 184 is moved forwardly. At slow rates of vehicle deceleration, the pressure in the unit's outlet connection 226 will be greater than that supplied to the inlet connection 192 by the servomotor A, and only at the very highest rates of vehicle deceleration will the valve structure remain open to communicate full vacuum from the servomotor A to the pressure modifying unit D. At slow rates of vehicle deceleration, pressure differential acting upon a large area of the diaphragm 182 brings the valve seat 194 into engagement with the flange 198 to prevent further drop in pressure; if for some reason the piston 184 should move too far forwardly, it will move the flange 200 of the poppet member 196 out of engagement with the atmospheric valve seat 206 to bleed pressure into the outlet connection 226 causing both valve seats to again abut the poppet member 196.

Upon release of actuating force upon the brake pedal 64, hydraulic pressure to the vehicle's brake structure is released and the rate of vehicle deceleration thereby decreased; whereupon the spring 210 biases the valve seat 206 rearwardly to communicate full atmospheric pressure to the outlet connection 226, and hence to the pressure modifying unit D.

It will be apparent that the objects heretofore emunerated as well as others have been accomplished; and that there has been provided an automotive braking system which will prevent both its front or rear wheels from sliding prematurely under any brake lining condition or road condition.

While the invention has been described in considerable detail, I do not wish to be limited to the particular embodiments shown and described, and it it is my intention to cover hereby all novel adaptations, modifications and arrangements thereof which come within the practice of those skilled in the art to which the invention relates.

I claim:

1. For a vehicle braking system having front and rear brakes:

a hydraulic fluid displacement means for developing hydraulic pressure for actuating said front and rear brakes;

a servomotor means operatively connected with said fluid displacement means and said rear brakes, which servomotor means includes a housing divided into a first, a second, and a third chamber for an input piston, an output piston and a pressure suspended piston, respectively, with means to integrally connect said pistons, the operative connection between the servomotor means and the means distributing hydraulic pressure to said rear brakes being arranged such that said hydraulic pressure is directed to said input piston;

a fluid pressure source in communication with one end of said third chamber on one side of said pressure suspended piston adjacent said input piston;

a control valve structure including a housing having a cavity therein including a first inlet connected to said fluid pressure source, a second inlet communicating with a pressure differing from said fluid pressure source, and a discharge port connected by appropriate means to said third chamber on the other side of said pressure suspended piston, said control valve structure further including a valve means including a pressure responsive member operatively arranged in said housing to control communication between said first or second inlets with said discharge port; and a deceleration responsive means operatively connected to said valve means to normally allow communication of one of said inlets with said discharge port and arranged to prevent communication between said inlets and said discharge port before a transition of closing said inlet normally open to said discharge port and opening said second inlet to said discharge port.

2. For a vehicle braking system having front and rear brakes in accordance with claim 1 wherein said pressure responsive member of said valve means includes means to vary the effective area of said pressure responsive member to provide varying resistance to the operation of said valve means by said deceleration responsive means.

3. For a vehicle braking system having front and rear brakes:

a fluid displacement means for developing hydraulic pressure including means for distributing said hydraulic pressure to said front brakes and means for distributing said hydraulic pressure to said rear brakes;

a servomotor means operatively connected to said means distributing hydraulic pressure to said rear brakes, which servomotor means includes a housing divided into a first, a second, and a third chamber for an input piston, an output piston and a pressure suspended piston, respectively, with means to integrally connect said pistons, the operative connection between the servomotor means and the means distributing hydraulic pressure to said rear brakes being arranged such that said hydraulic pressure is directed to said input piston;

a fluid pressure source in communication with one end of said third chamber on one side of said pressure suspended piston;

a control valve structure operatively arranged to communicate a fluid pressure to said third chamber of said servomotor means on the other side of said pressure suspended piston that will oppose actuation thereof including, a housing having fluid pressure inlets and a fluid pressure outlet interposed between said inlets which lead to respective first and second chambers within said housing, said outlet being arranged to receive a conduit to connect said outlet with said third chamber as aforementioned, with further provisions in said inlets to connect one of said inlets to said fluid pressure source and the other of said inlets to a source of fluid pressure different from said fluid pressure source, a movable wall in said second chamber dividing said second chamber into first and second variable volume chambers, said movable wall having an axial passage therethrough for communicating said first and second variable volume chambers, a valve poppet operatively connected to said housing to control an opening therein communicating said first and second chambers, said valve poppet being normally biased by a spring to close communication between said first and second chambers and arranged to cooperate with said movable wall and close said axial passage therethrough wherein said movable wall is moved a predetermined distance to abut on said valve poppet with further movement of said movable wall acting to open said opening in said housing to communicate a fluid pressure differing from that of said fluid pressure source to said outlet and by said conduit to said third chamber of said servomotor means to oppose actuation of said servomotor means, and a deceleration responsive means operatively connected to said valve means to allow communication of one of said inlets with said discharge port and arranged to prevent communication between said inlets and said discharge port before a transition of closing said inlet normally open to said discharge port and opening said second inlet to said discharge port, said deceleration means being biased by fluid pressure during and after said transition.

4. For a vehicle braking system including front and rear brakes:

a hydraulic fluid displacement means for developing hydraulic pressure including means for distributing said hydraulic pressure to said front brakes and means for distributing said hydraulic pressure to said rear brakes;

a servomotor means operatively connected to said hydraulic fluid displacement means, which servomotor means includes a housing divided into a first, a second, and a third chamber for an input piston, an output piston and a pressure suspended piston, respectively, with means to integrally connect said pistons, the operative connection between the servomotor means and the means distributing hydraulic pressure to said rear brakes being arranged such that said hydraulic pressure is directed to said input piston;

a fluid pressure source in communication with one end of said third chamber on one side of said pressure suspended piston;

a control valve structure operatively arranged to communicate a fluid pressure to said servomotor means, said control valve structure including, a housing having spaced fluid pressure inlets and a fluid pressure outlet interposed between said inlets which lead to respective first and second chambers within said housing with an opening in said housing communicating said first and second chambers, a movable wall in said second chamber of said housing dividing said second chamber into first and second variable volume chambers, said movable wall having an axial passage therethrough for communicating said first and second variable volume chambers, a valve poppet operatively connected to said housing and normally biased by a spring to close said opening in said housing between said first and second chambers, said valve poppet being adapted to be controlled by said movable wall and arranged to close said passage in said movable wall communicating said first and second variable volume chambers when said movable wall has moved a predetermined distance to abut on said valve poppet with further movement of said movable wall opening said valve poppet to communicate one of said variable volume chambers with said first chamber; and a means responsive to the deceleration of said vehicle, which means is operatively connected to said movable wall to normally allow communication of said first and second variable volume chambers in said second chamber of said control valve structure and arranged to terminate such communication and thereafter open communication of said first chamber with one of said variable volume chambers that is operatively connected to said servomotor means, said means being biased by a fluid pressure differential across said movable wall after termination of communication between said first and second variable volume chambers.

5. For a vehicle braking system having front and rear brakes:
   a hydraulic fluid displacement means for developing hydraulic pressure;
   a servomotor means operatively arranged between said hydraulic fluid displacement means and said front and rear brakes, which servomotor means includes a housing divided into a first, a second, and a third chamber for an input piston, an output piston and a pressure suspended piston, respectively, with means to integrally connect said pistons;
   a fluid pressure source in communication with one end of said third chamber on one side of said pressure suspended piston in said servomotor means;
   a control valve structure operatively arranged to communicate a fluid pressure to said servomotor means said control valve structure including,
   a housing having a first fluid pressure inlet and a second fluid pressure inlet that are spaced part with a fluid pressure outlet interposed between said inlets, said first and second inlets leading to first and second cavities within said housing, said cavities being communicated by a passage within said housing,
   a movable wall in said second cavity dividing said second cavity into first and second variable volume chambers, said movable wall having an axial passage therethrough for communicating said first and second variable volume chambers,
   a valve poppet operatively connected to said housing for controlling said passage in said housing and said passage in said movable wall, said valve poppet being normally biased by a spring to close said passage and prevent communication of said first and second cavities; and
   a means responsive to deceleration of said vehicle operatively connected to said movable wall to position said movable wall such that under a predetermined deceleration said movable wall will abut said valve poppet to close said passage through said movable wall with further deceleration forces causing said movable wall to move said valve poppet to open said passage in said housing.

6. For a vehicle brake system according to claim 5 wherein said movable wall of said control valve structure is characterized as including:
   a piston member slidably mounted at one end in said housing and supported at the other end of the piston member by a diaphragm to said housing which diaphragm is arranged to unfold from the adjacent piston end onto the housing walls and vice versa as said piston is reciprocated to vary the effective area of said diaphragm and thus the resistance of said piston to the control of said deceleration sensing means.

References Cited by the Examiner

UNITED STATES PATENTS

| | | | |
|---|---|---|---|
| 2,132,914 | 10/38 | Fitch. | |
| 2,868,338 | 1/59 | Lucien et al. | 188—181 |
| 2,906,561 | 9/59 | Holton | 303—24 |
| 3,038,761 | 6/62 | Kenrick | 303—6 |

EUGENE G. BOTZ, *Primary Examiner.*

A. JOSEPH GOLDBERG, ARTHUR L. LA POINT,
*Examiners.*

UNITED STATES PATENT OFFICE
CERTIFICATE OF CORRECTION

Patent No. 3,184,269

May 18, 1965

Robert R. Hager

It is hereby certified that error appears in the above numbered patent requiring correction and that the said Letters Patent should read as corrected below.

Column 6, line 62, for "b", in italics, read -- G --.

Signed and sealed this 21st day of December 1965.

(SEAL)
Attest:

ERNEST W. SWIDER
Attesting Officer

EDWARD J. BRENNER
Commissioner of Patents